United States Patent
Tokunaga (10) Patent No.: US 12,282,842 B2
(45) Date of Patent: Apr. 22, 2025

(54) NEURAL NETWORK PROCESSING APPARATUS, NEURAL NETWORK PROCESSING METHOD, AND NEURAL NETWORK PROCESSING PROGRAM

(71) Applicant: MAXELL, LTD., Kyoto (JP)

(72) Inventor: Hiroyuki Tokunaga, Tokyo (JP)

(73) Assignee: MAXELL, LTD., Kyoto (JP)

(*) Notice: Subject to any disclaimer, the term of this patent is extended or adjusted under 35 U.S.C. 154(b) by 898 days.

(21) Appl. No.: 17/292,661

(22) PCT Filed: Sep. 10, 2019

(86) PCT No.: PCT/JP2019/035493
§ 371 (c)(1),
(2) Date: May 10, 2021

(87) PCT Pub. No.: WO2020/100393
PCT Pub. Date: May 22, 2020

(65) Prior Publication Data
US 2022/0004857 A1    Jan. 6, 2022

(30) Foreign Application Priority Data
Nov. 15, 2018 (JP) .................. 2018-214570

(51) Int. Cl.
*G06N 3/06* (2006.01)
*G06F 9/50* (2006.01)
*G06N 3/063* (2023.01)

(52) U.S. Cl.
CPC .......... *G06N 3/063* (2013.01); *G06F 9/5016* (2013.01)

(58) Field of Classification Search
CPC ................................................. G06N 3/063
See application file for complete search history.

(56) References Cited

U.S. PATENT DOCUMENTS 10,089,577 B2 * 10/2018 Umuroglu ............ G06N 3/0495
2016/0148078 A1 * 5/2016 Shen ...................... G06N 3/045
382/158
2020/0005131 A1    1/2020 Nakahara et al.

FOREIGN PATENT DOCUMENTS

CN        109844775 A    6/2019
JP        2006-127350 A    5/2006
(Continued)

OTHER PUBLICATIONS

Shin et al ("DNPU: An Energy-Efficient Deep-Learning Processor with Heterogeneous MultiCore Architecture" Oct. 2018) (Year: 2018).*

(Continued)

*Primary Examiner* — Lut Wong
(74) *Attorney, Agent, or Firm* — WOMBLE BOND DICKINSON (US) LLP (57) ABSTRACT

A CNN processing apparatus (1) includes an input buffer (10) configured to store an input signal given to a CNN, a storage unit (12) configured to store a table (120) in which the input signal given to the CNN and a binary signal corresponding to the value of the input signal are associated with each other, a binary signal acquisition unit (13) configured to acquire the binary signal corresponding to the value of the input signal stored in the input buffer (10) by referring to the table (120), and a convolutional operation unit (14) configured to perform an operation of the CNN based on the binary signal acquired by the binary signal acquisition unit (13). The binary signal has an accuracy complying with a predetermined operation accuracy of the CNN.

2 Claims, 7 Drawing Sheets

(56) References Cited

FOREIGN PATENT DOCUMENTS

| JP | 2018-092377 A | 6/2018 |
| WO | 2017/073373 A1 | 5/2017 |
| WO | 2020/100393 A1 | 5/2020 |

OTHER PUBLICATIONS

Abdelouahab et al ("Accelerating CNN inference on FPGAs: A Survey" Jan. 2018) (Year: 2018).*

Decision to Grant a Patent of the Japanese Patent Office dated Mar. 22, 2021 for related Japanese Patent Application No. 2020-504042.

International Preliminary Report on Patentability of the International Searching Authority dated May 27, 2021 for related PCT Application No. PCT/JP2019/035493.

International Search Report and Written Opinion of the International Searching Authority dated Nov. 26, 2019 for related PCT Application No. PCT/JP2019/035493.

Notice of Reasons for Refusal of the Japanese Patent Office dated May 10, 2022 for related Japanese Patent Application No. 2021-078513.

Notice of Reasons for Refusal of the Japanese Patent Office dated Oct. 27, 2020 for related Japanese Patent Application No. 2020-504042.

Rastegari et al., "XNOR-Net: ImageNet Classification Using Binary Convolutional Neural Networks", Computer Vision—ECCV 2016: 14th European Conference Proceedings, Part IV, ECCV, 2016, pp. 525-542.

Office Action received for Taiwan Patent Application No. 109103955, mailed on Sep. 5, 2023, 15 pages (7 pages of English Translation and 8 pages of Original Document).

Asoh et al., "Deep Learning", Publisher: Kindai kagaku sha Co., Ltd, Tokyo, Japan, Oct. 31, 2015, p. 156.

Shimoda et al., "All Binarized Conventional Neural Network and its Implementation on an FPGA", IEICE Technical Report, vol. 117, No. 378, Jan. 11, 2018, pp. 7-11 (English Abstract Submitted).

Mohammad et al., "XNOR / Net: ImageNet Classification Using Binary Convolutional Neural Networks", European Conference on Computer Vision, ECCV 2016, pp. 525-542.

Notice of Reasons for Refusal of the Japanese Patent Office dated Nov. 15, 2022 for related Japanese Patent Application No. 2021-078513.

\* cited by examiner

NEURAL NETWORK PROCESSING APPARATUS, NEURAL NETWORK PROCESSING METHOD, AND NEURAL NETWORK PROCESSING PROGRAM

TECHNICAL FIELD

The present invention relates to a neural network processing apparatus, a neural network processing method, and a neural network processing program.

BACKGROUND ART

In recent years, as a deep neural network used to classify images into a plurality of categories, a convolutional neural network (CNN) has received attention. The CNN is characterized by including a convolution layer in a deep neural network.

Figure 11:
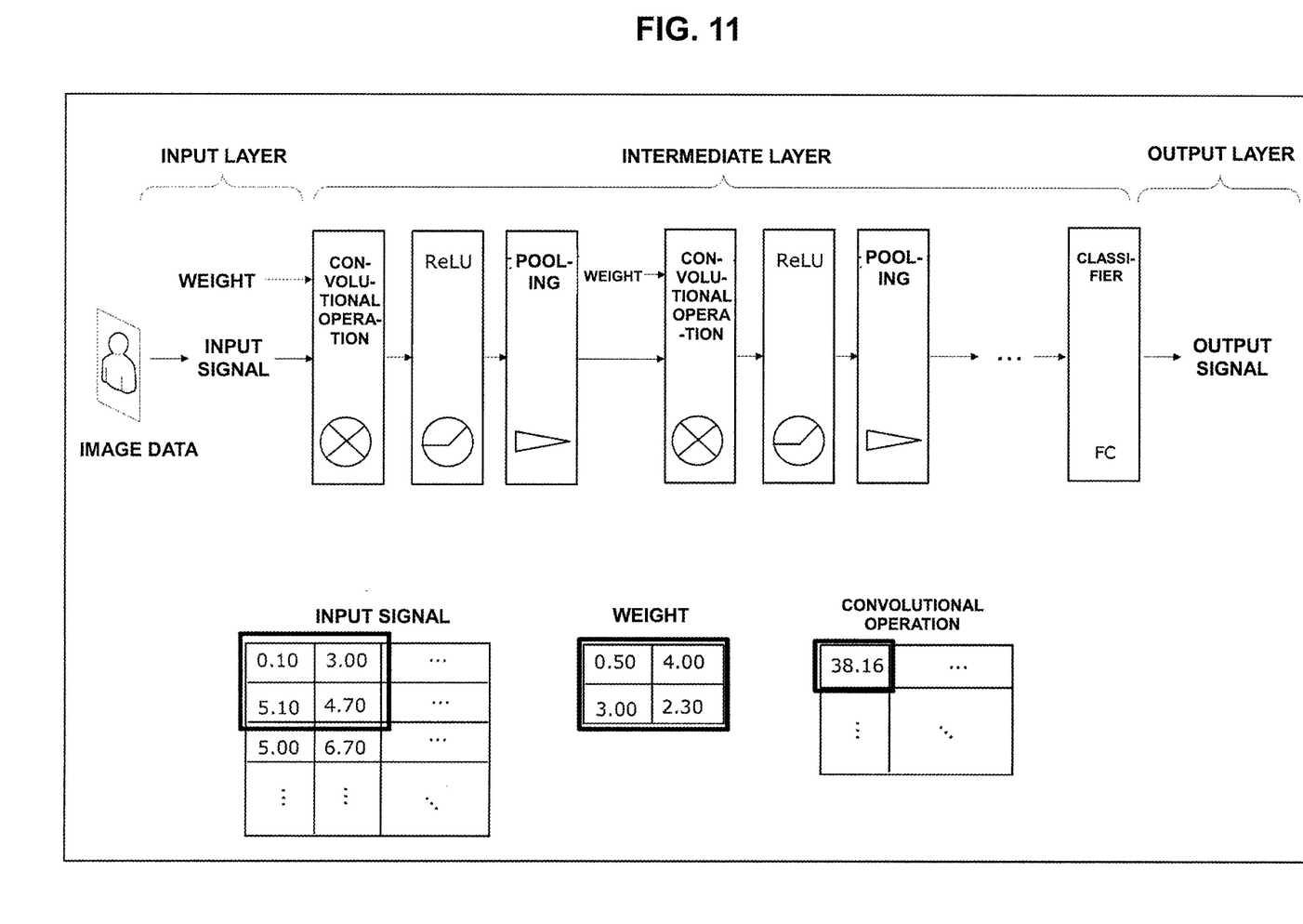
FIG. 11 is a view for explaining arithmetic processing of a conventional CNN.

FIG. 11 is a view showing the procedure of signal processing of a general CNN. The CNN includes an input layer, an intermediate layer, and an output layer (see, for example, non-patent literature 1). In the intermediate layer, a convolutional operation of multiplying an input layer by a weight is performed. Also, ReLU (Rectified Linear Units) is applied to the result of the convolutional operation in the intermediate layer, and the output of each intermediate layer is decided. In some cases, pooling processing is performed.

The feature of an input signal extracted via the convolutional operation is input to a classifier formed by a fully connected layer, and the classification result is output from the output layer. As described above, one of the features of a neural network such as a CNN is that the convolutional operation is repetitively performed.

The input value or weight of input data used in the CNN is expressed by, for example, a 32-bit floating point number format and sometimes includes a decimal point. In the convolutional operation of a conventional neural network such as a CNN, arithmetic processing is performed while ensuring the number of digits of an operation result, as indicated by the values of "input signal", "weight", and "convolutional operation" in FIG. 11.

However, when the conventional neural network such as a CNN is implemented by embedded hardware such as an FPGA (Field Programmable Gate Array) or a microcomputer, the calculation resource is limited. For this reason, the processing speed of a number of arithmetic processes for a number of input values with a large number of digits lowers.

To solve such a problem, a CNN that binarizes an input signal to the neural network has been conventionally proposed (see non-patent literature 2). By the binarized neural network, processing can be speeded up, and the memory use amount can be reduced.

RELATED ART LITERATURE

Non-Patent Literature

Non-Patent Literature 1: Hideki Aso et al., "Deep Learning", Kindaikagaku-sha, November 2015

Non-Patent Literature 2: Mohammad Rastegari, Vicente Ordonez, Joseph Redmon, and Ali Farhadi, "Xnor-net: Imagenet classification using binary convolutional neural networks", In European Conference on Computer Vision, pages 525-542, Springer, 2016

DISCLOSURE OF INVENTION

Problem to be Solved by the Invention

However, in the conventional neural network using a binarized input signal, particularly, the accuracy of the network degrades when the input signal is directly binarized in the first layer of the multilayer neural network.

The present invention has been made to solve the above-described problem, and has as its object to provide a neural network processing technique capable of suppressing degradation of the accuracy of a neural network even if a binarized input signal is used.

Means of Solution to the Problem

In order to solve the above-described problem, according to the present invention, there is provided a neural network processing apparatus comprising a first memory configured to store a value given to a neural network, a second memory configured to store a table in which the value given to the neural network and a binary signal corresponding to the value are associated with each other, a binary signal acquisition unit configured to acquire the binary signal corresponding to the value stored in the first memory by referring to the table, and a neural network operation unit configured to perform an operation of the neural network based on the binary signal acquired by the binary signal acquisition unit, wherein the binary signal has an accuracy complying with a predetermined operation accuracy of the neural network.

In order to solve the above-described problem, according to the present invention, there is provided a neural network processing method comprising a first step of storing, in a first memory, a value given to a neural network, a second step of storing, in a second memory, a table in which the value given to the neural network and a binary signal corresponding to the value are associated with each other, a third step of acquiring the binary signal corresponding to the value stored in the first memory by referring to the table, and a fourth step of performing an operation of the neural network based on the binary signal acquired in the third step, wherein the binary signal has an accuracy complying with a predetermined operation accuracy of the neural network.

In order to solve the above-described problem, according to the present invention, there is provided a neural network processing program causing a computer to execute a first step of storing, in a first memory, a value given to a neural network, a second step of storing, in a second memory, a table in which the value given to the neural network and a binary signal corresponding to the value are associated with each other, a third step of acquiring the binary signal corresponding to the value stored in the first memory by referring to the table, and a fourth step of performing an operation of the neural network based on the binary signal acquired in the third step, wherein the binary signal has an accuracy complying with a predetermined operation accuracy of the neural network.

Effect of the Invention

According to the present invention, a table in which a value given to a neural network and a binary signal corresponding to the value are associated with each other is referred to, thereby acquiring a binary signal having an accuracy complying with a predetermined operation accuracy of the neural network. It is therefore possible to suppress degradation of the accuracy of the neural network even if a binarized input signal is used.

BEST MODE FOR CARRYING OUT THE INVENTION

Preferred embodiments of the present invention will now be described in detail with reference to FIGS. 1 to 10.

First Embodiment

A neural network processing apparatus according to the present invention is a CNN processing apparatus 1 using a CNN as a neural network.

The CNN processing apparatus 1 according to this embodiment is an arithmetic processing apparatus that acquires a binary signal in correspondence with a value given to the CNN and performs a convolutional operation based on the binary signal. The CNN processing apparatus 1 also applies an activation function to the result of the convolutional operation, thereby deciding the output of a convolution layer corresponding to one layer of the intermediate layer of the CNN. The output of the activation function undergoes pooling processing as needed. The thus obtained output of the convolution layer is used as the input signal to the subsequent convolution layer.

Note that in the following description, a "value" given to the CNN is, for example, an "input signal" such as image data to be described later. A description will be made using an example in which a binary signal corresponding to such an input signal is acquired.

[Functional Blocks of CNN Processing Apparatus]

The above-described CNN processing apparatus 1 includes an input buffer (first memory) 10, a weight buffer 11, a storage unit (second memory) 12, a binary signal acquisition unit 13, a convolutional operation unit (neural network operation unit) 14, and an output buffer 15.

The input buffer 10 is a memory that stores an input signal given to the CNN. More specifically, the input buffer 10 is implemented by a main storage device 103 to be described later, and, for example, image data and the like given from the outside are stored in the input buffer 10. The input signal given to the input buffer 10 may be image data that has undergone preprocessing in advance. Examples of preprocessing are monochrome conversion, contrast adjustment, and brightness adjustment. The input signal may be reduced such that it has a bit depth set in accordance with a CNN model set in advance in the CNN processing apparatus 1.

As the value of the input signal given to the input buffer 10, for example, a value including a decimal point and expressed by an array of a floating point number of 32-bit or 16-bit accuracy, or a value obtained by reducing these values to a predetermined bit number expression is used. As the predetermined bit number expression, for example, a data type having an arbitrary size, such as the 16-bit or 8-bit signed or unsigned integer type can be used.

The weight buffer 11 is a memory that stores the weight of the CNN. More specifically, the weight buffer 11 is implemented by the main storage device 103 to be described later, and the weight parameter of the CNN, which is stored in the storage unit 12 or a server (not shown) installed outside the CNN processing apparatus 1, is loaded into the weight buffer 11. As the value of the weight, for example, a value of 1-bit expression, which is binarized in advance, is used (for example, see non-patent literature 2).

The storage unit 12 stores a table 120 in which a value given to the CNN is associated with a binary signal corresponding to the value. The binary signal has an accuracy complying with a predetermined operation accuracy of the CNN. For example, the binary signal is a signal of binary expression obtained by replacing the input signal given to the CNN with a code including an information amount necessary for the CNN to obtain a desired accuracy. Hence, the binary signal here is a signal including an information amount larger than that of the original input signal.

The table 120 has, for example, a data structure such as a Look Up Table (LUT), and outputs a binary signal stored as the address of the input value of the input signal. For example, if an input signal is expressed by the 8-bit unsigned integer type (unit8), binary signals corresponding to values in the possible range [0, 255] of the input signal are stored in the table 120.

The binary signal acquisition unit 13 acquires a binary signal corresponding to the input signal stored in the input buffer 10 by referring to the table 120.

The convolutional operation unit 14 performs a convolutional operation based on the binary signal acquired by the binary signal acquisition unit 13. More specifically, the convolutional operation unit 14 performs a convolutional operation based on the binary signal corresponding to the input signal such as image data and the weight binarized in advance and read out from the weight buffer 11.

Both the input signal and the weight input to the convolutional operation unit 14 are binarized signals. Hence, the convolutional operation executed by the convolutional operation unit 14 does not need multiplication processing, and can obtain the result of the convolutional operation by bit arithmetic processes including exclusive NOR (XNOR), subtraction, and bit shift. Details of the arithmetic processing by the convolutional operation unit 14 will be described later.

The output buffer 15 is a memory that temporarily stores the operation result by the convolutional operation unit 14.

[Hardware Arrangement of CNN Processing Apparatus]

An example of the hardware arrangement of the CNN processing apparatus 1 having the above-described functions will be described next with reference to the block diagram of FIG. 2.

Figure 2:
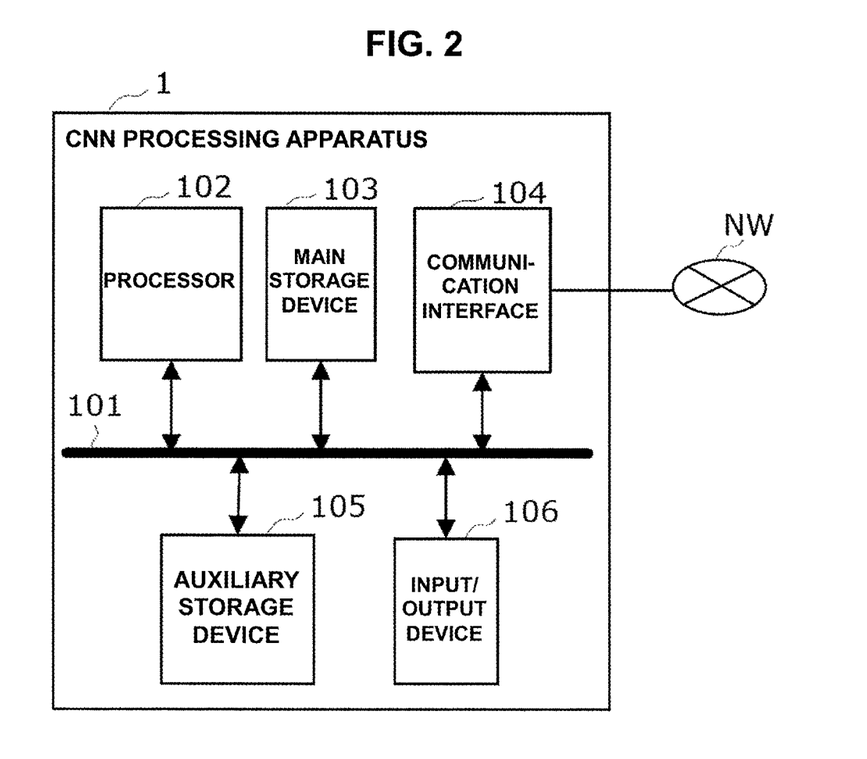
FIG. 2 is a block diagram showing the hardware arrangement of the CNN processing apparatus according to the first embodiment.

As shown in FIG. 2, the CNN processing apparatus 1 can be implemented by, for example, a computer including a processor 102, the main storage device 103, a communication interface 104, an auxiliary storage device 105, and an input/output device 106, which are connected via a bus 101, and a program configured to control these hardware resources.

A program to be used by the processor 102 to perform various kinds of control and operations is stored in the main storage device 103 in advance. By the processor 102 and the main storage device 103, the functions of the CNN processing apparatus 1 including the binary signal acquisition unit 13 and the convolutional operation unit 14 shown in FIG. 1 are implemented.

Figure 1:
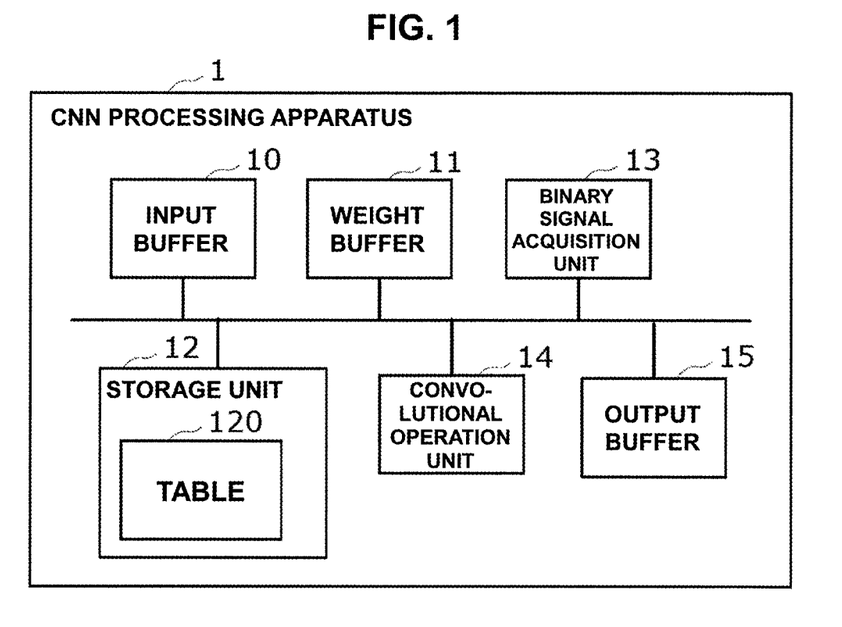
FIG. 1 is a block diagram showing the function of a CNN processing apparatus according to the first embodiment of the present invention.

By the main storage device 103, the input buffer 10, weight buffer 11, and the output buffer 15 described with reference to FIG. 1 are implemented.

The communication interface 104 is an interface circuit configured to perform communication with various kinds of external electronic devices via a communication network NW. An input signal such as image data and a weight to be used by the CNN processing apparatus 1 may be received from an external server or the like via the communication interface 104. In addition, the table 120 may be received from an external server or the like to the storage unit 12 via the communication interface 104.

The auxiliary storage device 105 is formed by a readable/writable storage medium and a driving device configured to read/write various kinds of information such as a program and data from/to the storage medium. In the auxiliary storage device 105, a hard disk or a semiconductor memory such as a flash memory can be used as the storage medium.

The auxiliary storage device 105 includes a storage area configured to store an input signal and a weight acquired from the outside, and a program storage area configured to store a program used by the CNN processing apparatus 1 to execute arithmetic processing of the CNN such as a convolutional operation. The storage unit 12 described with reference to FIG. 1 is implemented by the auxiliary storage device 105. Also, for example, the auxiliary storage device 105 may include a backup area configured to back up the above-described data or program.

The input/output device 106 is formed by an I/O terminal that inputs a signal from an external device or outputs a signal to an external device. A display device (not shown) may be provided to display, via the input/output device 106, an operation result output by the CNN processing apparatus 1.

The program stored in the program storage area of the auxiliary storage device 105 may be a program configured to time-serially perform processing in accordance with the order of a CNN processing method to be described in this specification, or may be a program configured to perform processing in parallel or at a necessary timing such as the timing of invoking. The program may be processed by one computer, or may be distributedly processed by a plurality of computers.

[CNN Processing Method]

The operation of the CNN processing apparatus 1 having the above-described arrangement will be described next with reference to FIG. 3. As a presumption, the table 120 is stored in the storage unit 12 in advance. Also, in the following description, as for a weight, a corresponding binary signal is assumed to be stored in the storage unit 12 in advance.

First, the input buffer 10 temporarily stores an input signal A given from a server or the like installed outside the CNN processing apparatus 1 (step S1). For example, the input signal A is a signal expressed by the 8-bit unsigned integer type (unit8), and has a value range of [0, 255].

Next, the binary signal acquisition unit 13 reads out the input signal from the input buffer 10, and acquires a binary signal corresponding to the input signal by referring to the table 120 (step S2).

Figure 3:
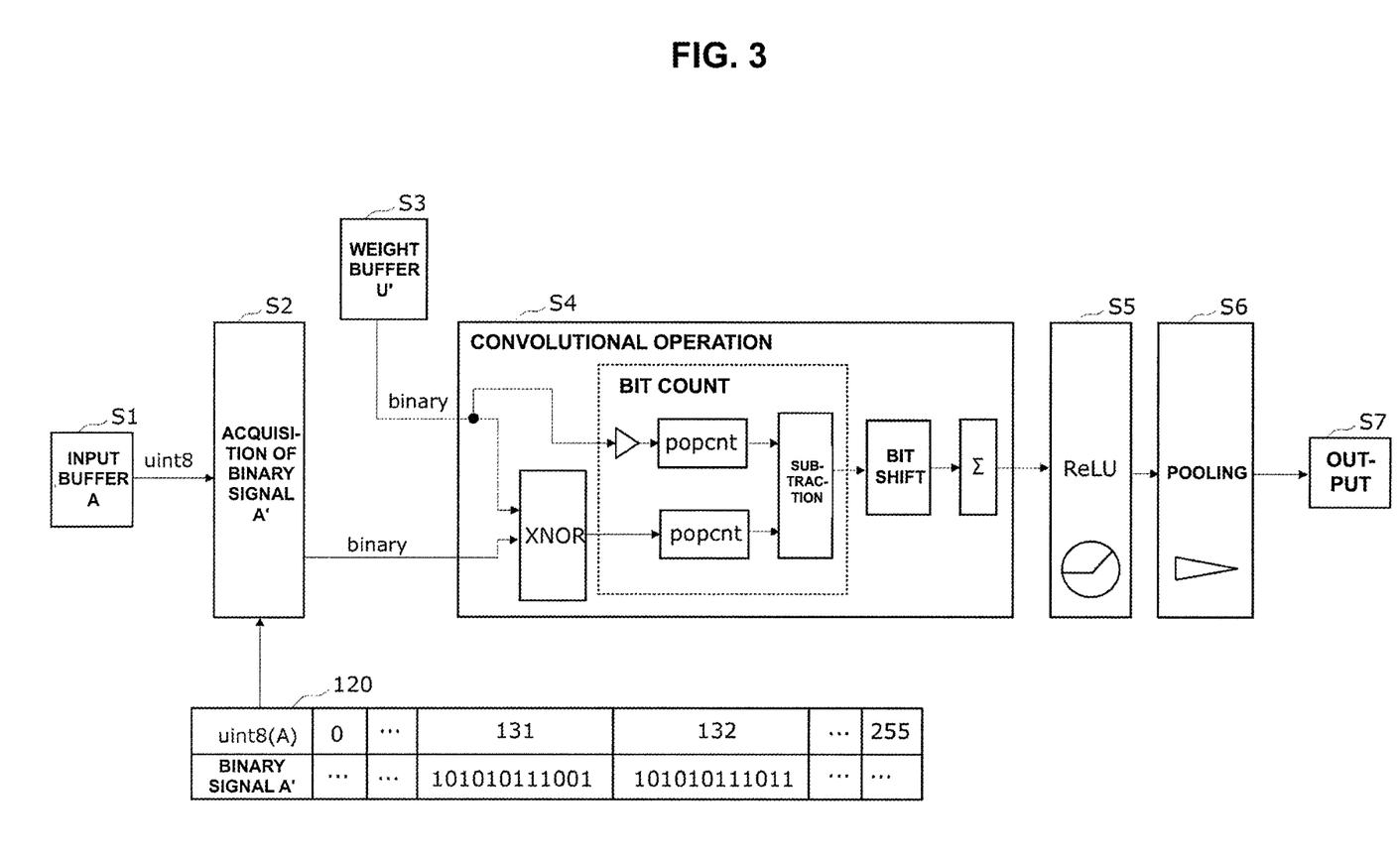
FIG. 3 is a view for explaining the procedure of a CNN processing method according to the first embodiment.

More specifically, as shown in FIG. 3, for example, for an input signal "131", the binary signal acquisition unit 13 refers to the table 120 and acquires a 12-bit width binary signal "101010111001" stored at an input address "131". Also, as described above, the table 120 stores binary signals corresponding to values in the possible range [0, 255] of the input signal. In addition, the binary signal "101010111001" corresponding to the main storage device is a signal including an information amount larger than that of the input signal "131".

After that, a binary signal U' of a weight stored in the storage unit 12 is transferred to the weight buffer 11 (step S3). More specifically, the weight U' is a signal expressed by one bit "0" or "1".

Next, the binary signal corresponding to the input signal acquired by the binary signal acquisition unit 13 and the binary signal of the weight read out from the weight buffer 11 are input to the convolutional operation unit 14, and a convolutional operation is performed (step S4). For example, in the convolutional operation unit 14, a 12-bit width binary signal A' of the input signal and the 1-bit binary signal U' of the weight are input to an exclusive NOR (XNOR) circuit, and the XNOR of the binary signals A' and U' is calculated. The output of the XNOR circuit is input to a bit count circuit.

After that, the number of effective bit values "1" in the output from the XNOR circuit is counted by a bit counter (population count: popcnt).

On the other hand, the 12-bit width binary signal U' of the weight is inverted by an inverter (NOT), and after that, the number of effective bit values "1" is counted by a bit counter (popcnt). After that, the bit count circuit calculates the difference between the outputs from the bit counters and outputs the difference.

Next, a bit shift circuit calculates a shift value obtained by shifting the difference output from a subtraction circuit to the upper bit side and outputs the shift value. After that, the subtraction circuit adds the shift value output from the bit shift circuit and outputs the obtained addition result as the result of the convolutional operation.

After that, an activation function such as ReLU is applied to the result of the convolutional operation, thereby deciding the output of the convolution layer (step S5). In addition, well-known pooling processing is performed as needed (see non-patent literature 1), and the obtained output signal is stored in the output buffer 15 as the operation result of the convolution layer corresponding to one layer (step S7). Note that the output signal stored in the output buffer 15 is used as an input signal to a subsequent convolution layer.

The output of the convolutional operation obtained by repetitively performing the convolutional operation in the convolution layer of the CNN is input to a fully connected layer that constitutes a subsequent classifier (not shown) as the output of the feature extraction unit of the CNN, thereby discriminating the image data of the input signal A or the like.

As described above, according to the CNN processing apparatus 1 of the first embodiment, the binary signal acquisition unit 13 acquires a binary signal that corresponds to the input signal and has an accuracy matching a predetermined operation accuracy of the CNN by referring to the table 120. In addition, the CNN processing apparatus 1 performs the convolutional operation based on the acquired binary signal. For this reason, even if the binarized input signal is used, degradation of the accuracy of the CNN can be suppressed.

Second Embodiment

The second embodiment of the present invention will be described next. Note that in the following description, the same reference numerals as in the above-described first embodiment denote the same parts, and a description thereof will be omitted.

In the first embodiment, concerning the binary signal acquisition unit 13, a case in which the data type, the size, and the value range of the input signal read out from the input buffer 10 match those of the address value in the table 120 has been described. In the second embodiment, however, if an input signal stored in an input buffer 10 is, for example, a relatively long integer type or a value including a decimal point, the input signal is converted into a value of the same data type, size, and value range as those of the address value in a table 120, and a binary signal is acquired after that. Components different from the first embodiment will mainly be described below.

Figure 4:
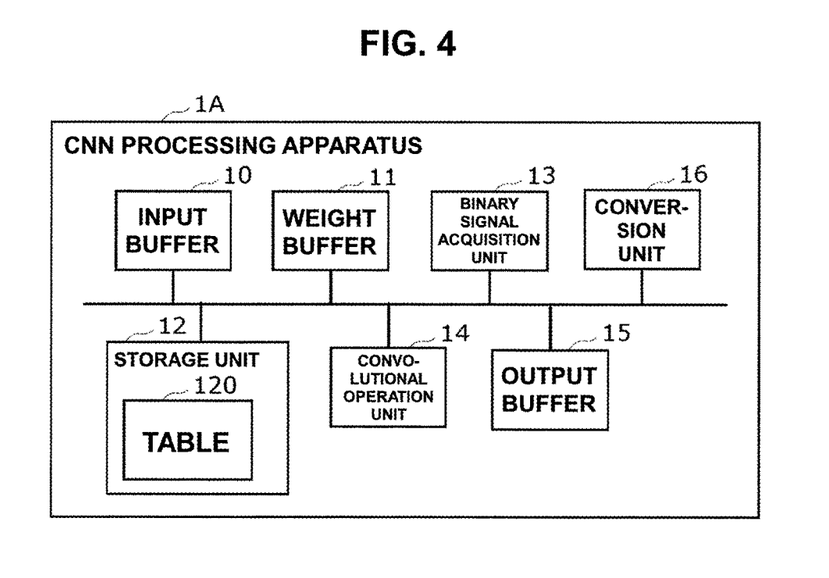
FIG. 4 is a block diagram showing the function of a CNN processing apparatus according to the second embodiment.

As shown in FIG. 4, a CNN processing apparatus 1A according to the second embodiment further includes a conversion unit 16. The remaining components provided in the CNN processing apparatus 1A are the same as in the first embodiment.

The conversion unit 16 converts the data type and the size of the input signal stored in the input buffer 10 into the data type and the size of an address value in the table 120 and then outputs the signal.

For example, if the input signal is of the 16-bit unsigned integer type (value range: [0, 65535]), the conversion unit 16 converts the signal into the 8-bit unsigned integer type (value range: [0, 255]) of the address value in the table 120 and then outputs the signal.

A binary signal acquisition unit 13 acquires a binary signal corresponding to the value output by the conversion unit 16.

[CNN Processing Method]

Figure 5:
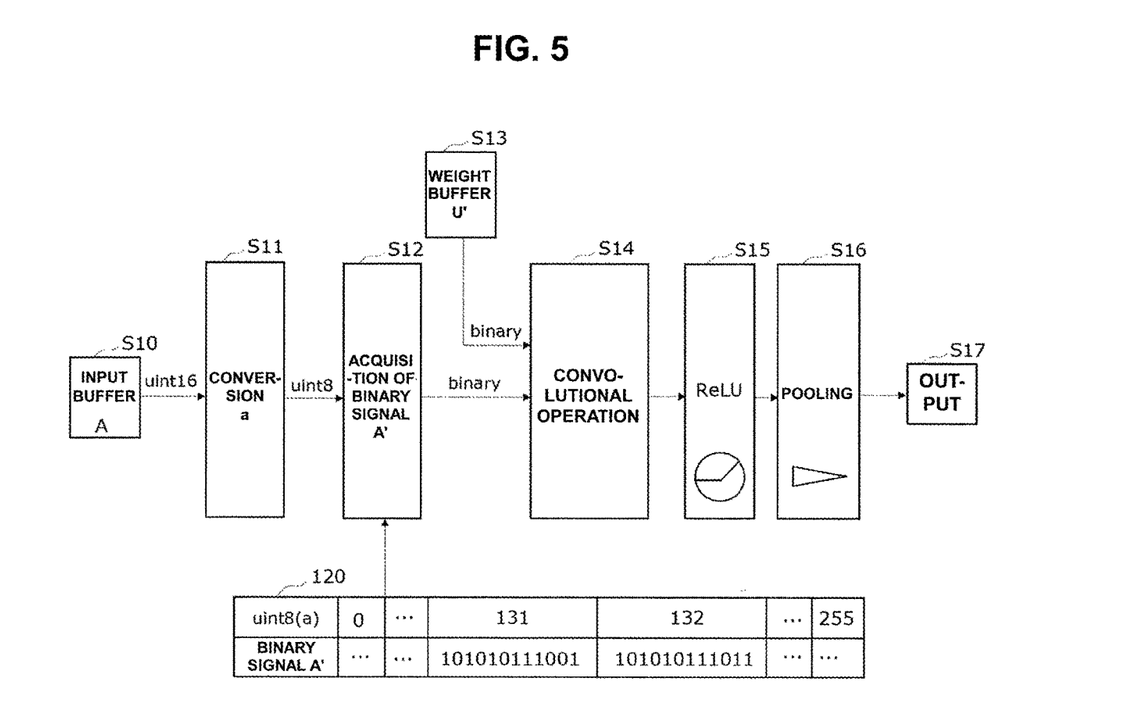
FIG. 5 is a view for explaining the procedure of a CNN processing method according to the second embodiment.

A CNN processing method according to this embodiment will be described next with reference to FIG. 5.

Note that as a presumption, the table 120 is stored in a storage unit 12 in advance. Also, in the following description, as for a weight, a corresponding binary signal is assumed to be stored in the storage unit 12 in advance.

First, the input buffer 10 temporarily stores an input signal A given from a server or the like installed outside the CNN processing apparatus 1A (step S10). For example, the input signal A is a signal expressed by the 16-bit unsigned integer type (unit 16), and has a value range of [0, 65535].

Next, the conversion unit 16 reads out the input signal A from the input buffer 10 and outputs a value obtained by converting the data type and the size of the input signal A into the data type and the size of the address value in the table 120 (step S11). For example, the input signal A of the 16-bit unsigned integer type (unit16) is converted into a value of the 8-bit unsigned integer type (unit8).

Next, the binary signal acquisition unit 13 acquires a binary signal A' corresponding to an input signal a output from the conversion unit 16 after the conversion by referring to the table 120 (step S12).

After that, a binary signal U' of a weight stored in the storage unit 12 is transferred to a weight buffer 11 (step S13). More specifically, the weight U' is a signal expressed by one bit "0" or "1".

Next, the binary signal A' corresponding to the input signal acquired by the binary signal acquisition unit 13 and the binary signal U' of the weight read out from the weight buffer 11 are input to a convolutional operation unit 14, and a convolutional operation is performed (step S14). The convolutional operation unit 14, for example, calculates the exclusive NOR (XNOR) of the binary signals A' and U' of the input signal and the weight and performs bit count (popcnt), thereby obtaining the operation result of the convolutional operation.

After that, an activation function such as ReLU is applied to the result of the convolutional operation, thereby deciding the output of the convolution layer (step S15). Then, well-known pooling processing is performed as needed (see non-patent literature 1) (step S16), and the obtained output signal is stored in an output buffer 15 as the operation result of the convolution layer corresponding to one layer (step S17). Note that the output signal stored in the output buffer 15 is used as an input signal to a subsequent convolution layer.

The output obtained by repetitively performing the convolutional operation in the convolution layer of the CNN is input to a fully connected layer that constitutes a subsequent classifier (not shown) as the output of the feature extraction unit of the CNN, thereby discriminating the image data of the input signal A or the like.

As described above, according to the CNN processing apparatus 1A of the second embodiment, the input signal is converted into the same data type and size as the data type and size of the address value in the table 120, and the corresponding binary signal is acquired after that. For this reason, in the CNN, even if an input signal of a relatively long integer type or including a decimal point is given, a binary signal including a larger information amount can be acquired. It is therefore possible to suppress degradation of the accuracy of the CNN.

Third Embodiment

The third embodiment of the present invention will be described next. Note that in the following description, the same reference numerals as in the above-described first and second embodiments denote the same parts, and a description thereof will be omitted.

In the first and second embodiments, a case in which the storage unit 12 stores one table 120 has been described. In the third embodiment, however, a storage unit 12 includes a plurality of tables 120B.

Figure 6:
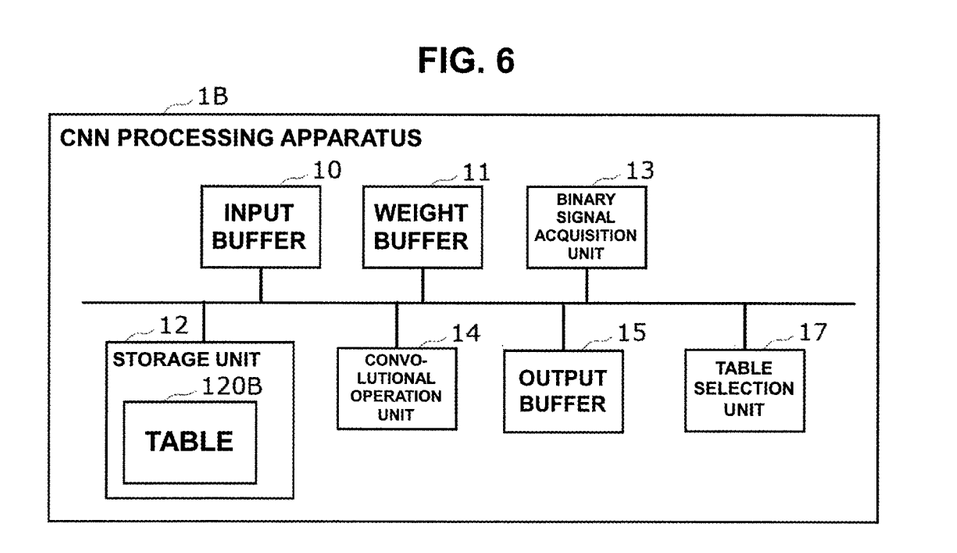
FIG. 6 is a block diagram showing the function of a CNN processing apparatus according to the third embodiment.

As shown in FIG. 6, in a CNN processing apparatus 1B according to this embodiment, the storage unit 12 includes the plurality of tables 120B, and the CNN processing apparatus further includes a table selection unit 17. The remaining components of the CNN processing apparatus 1B are the same as in the first embodiment.

Each of the plurality of tables 120B stores binary signals corresponding to values in the possible range of an input signal. In addition, the information amounts included in the binary signals stored in the plurality of tables 120B are different between the tables 120B. For example, if the input signal is of the 8-bit unsigned integer type, values in the range of [0, 255], for example, a binary signal "1010101110" associated with a value "131" and a binary signal "110110011110" associated with a value "131" in another table 120B are binary signals having accuracies different from each other.

As another example, in the value range of [0, 255], a binary signal including a predetermined information amount in the range of [0, 100] can be stored in a certain table 120B, and a binary signal including an information amount in the range of [101, 255], which is different from the binary signal in the range of [0, 100], can be stored in another table 120B.

For example, in accordance with the input signal stored in an input buffer 10, the table selection unit 17 selects, from the plurality of tables 120B, one table 120B based on a reference concerning the accuracy of the binary signal complying with a predetermined operation accuracy of the CNN. For example, consider a case in which as an input signal of image data, each of red R, green G, and blue B is expressed by a pixel value of the 8-bit unsigned integer type (value range: [0, 255]). When increasing the brightness or the like of such image data, a table to be applied can be defined in advance for the set value range of the input signal.

The information of the table selected by the table selection unit 17 is sent to a binary signal acquisition unit 13. The binary signal acquisition unit 13 acquires a binary signal corresponding to the input signal by referring to the table 120B according to the table information from the table selection unit 17.

[CNN Processing Method]

Figure 7:
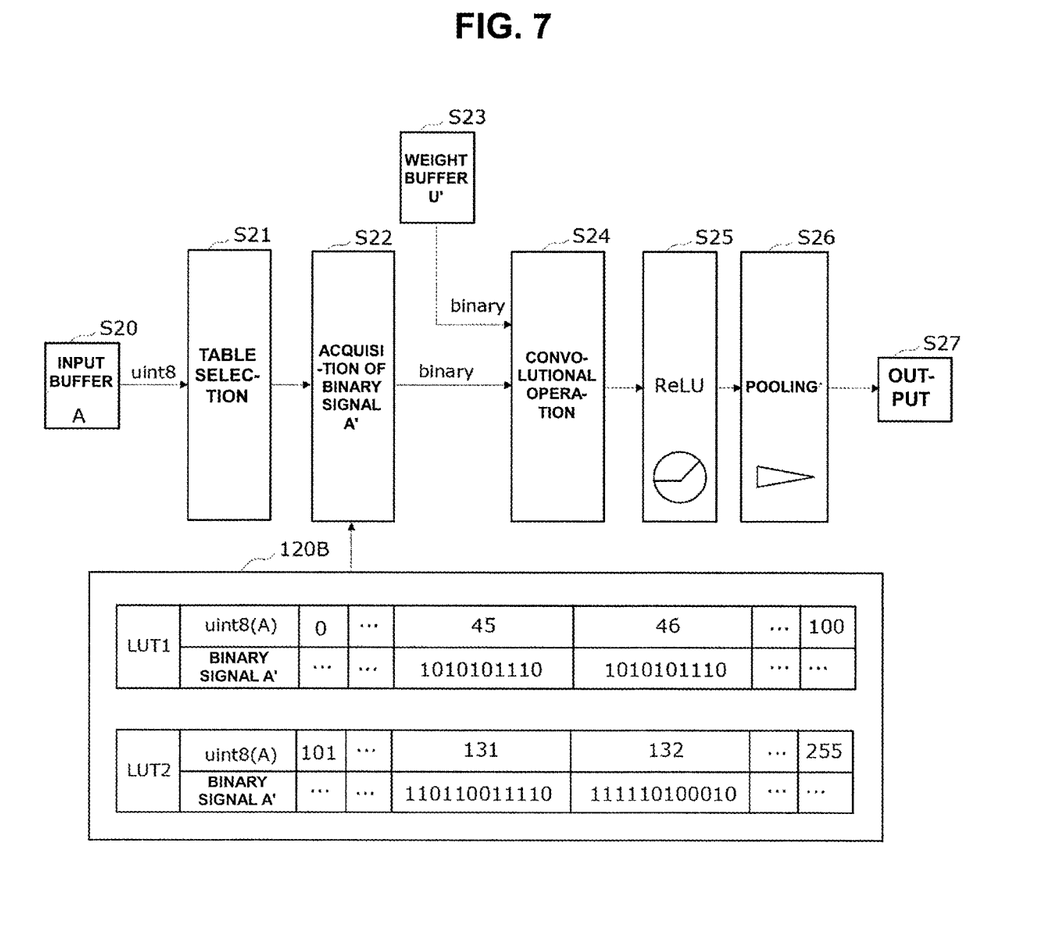
FIG. 7 is a view for explaining the procedure of a CNN processing method according to the third embodiment.

The operation of the CNN processing apparatus 1B having the above-described arrangement will be described next with reference to FIG. 7. As a presumption, the plurality of tables 120B are stored in the storage unit 12 in advance. Also, in the following description, as for a weight, a corresponding binary signal is assumed to be stored in the storage unit 12 in advance.

First, the input buffer 10 temporarily stores an input signal A given from a server or the like installed outside the CNN processing apparatus 1B (step S20). For example, the input signal A is a signal expressed by the 8-bit unsigned integer type (unit8).

Next, the table selection unit 17 reads out the input signal A from the input buffer 10, and selects one table 120B from the plurality of tables 120B in accordance with the value of the input signal A (step S21). For example, if the value of the input signal A is "45", the table selection unit 17 selects LUT1. If the value of the input signal A is a value in the range of [101, 255], the table selection unit 17 selects LUT2. Binary signals stored in the LUT1 and binary signals stored in the LUT2 are, for example, signals expanded to numbers of bits different from each other. In the example shown in FIG. 7, 10-bit binary signals are stored in the LUT1, and 12-bit binary signals are stored in the LUT2.

Next, the binary signal acquisition unit 13 acquires a binary signal A' corresponding to the input signal A by referring to the table 120B (LUT1 or LUT2) selected by the table selection unit 17 (step S22). After that, a binary signal U' of a weight stored in the storage unit 12 is transferred to a weight buffer 11 (step S23).

Next, the binary signal A' of the input signal A and the binary signal U' of the weight are input to a convolutional operation unit 14, and a convolutional operation is performed (step S24). The convolutional operation unit 14, for example, calculates the exclusive NOR (XNOR) of the binary signals A' and U' of the input signal and the weight and performs bit count (popcnt), thereby obtaining the operation result of the convolutional operation.

Next, an activation function such as ReLU is applied to the result of the convolutional operation, thereby deciding the output of the convolution layer (step S25). After that, well-known pooling processing is performed as needed (see non-patent literature 1) (step S26), and the obtained output signal is stored in an output buffer 15 as the operation result of the convolution layer corresponding to one layer (step S27). Note that the output signal stored in the output buffer 15 is used as an input signal to a subsequent convolution layer.

The output obtained by repetitively performing the convolutional operation in the convolution layer of the CNN is input to a fully connected layer that constitutes a subsequent classifier (not shown) as the output of the feature extraction unit of the CNN, thereby discriminating the image data of the input signal A or the like.

As described above, according to the CNN processing apparatus 1B of the third embodiment, the plurality of tables 120B are prepared in the storage unit 12, and a table is selected in accordance with the value of the input signal, thereby adjusting the information amount included in the binary signal to be acquired.

Fourth Embodiment

The fourth embodiment of the present invention will be described next. Note that in the following description, the same reference numerals as in the above-described first to third embodiments denote the same parts, and a description thereof will be omitted.

In the third embodiment, a case in which one table 120B is selected from the plurality of tables 120B prepared based on the reference common to values of input signals given to the CNN, and the binary signal is acquired has been described. In the fourth embodiment, however, a CNN processing apparatus 1C further includes a determination unit 18 configured to determine whether an input signal is a specific signal, and a table to be applied to the input signal is selected in accordance with the determination result of the determination unit 18. Components different from the first to third embodiments will mainly be described below.

Figure 8:
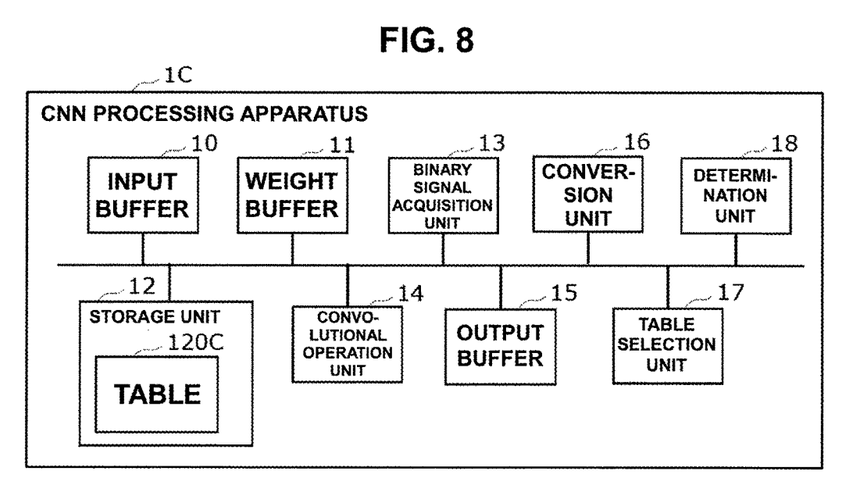
FIG. 8 is a block diagram showing the function of a CNN processing apparatus according to the fourth embodiment.

As shown in FIG. 8, the CNN processing apparatus 1C further includes the determination unit 18, and includes a storage unit 12 with a plurality of tables 120C. The remaining functional components provided in the CNN processing apparatus 1C are the same as in the first to third embodiments.

The determination unit 18 determines whether the value of an input signal stored in an input buffer 10 is a value representing specific information. Depending on the input signal, a value of a more important input signal may be included, or the information amount may be large as compared to the value of another input signal. For example, if the input signal is a signal representing pixel values of red R, green G, and blue B, and the pixel value of green G should be emphasized as compared to the values of the remaining colors, the determination unit 18 specifies, for example, the pixel value of green G included in the input signal.

The plurality of tables 120C are provided in correspondence with at least the data types and sizes of values of input signals given to the CNN. For example, the plurality of tables 120C are formed by a table in which binary signals corresponding to input signals of the 8-bit unsigned integer type are stored, a table in which binary signals corresponding to input signals of the 6-bit unsigned integer type are stored, and the like. In addition, binary signals stored in the plurality of tables are signals expanded to have information amounts different from each other. For example, a binary signal corresponding to an input signal of the 8-bit unsigned integer type can include a larger information amount as compared to a binary signal corresponding to an input signal of the 6-bit unsigned integer type.

Figure 9:
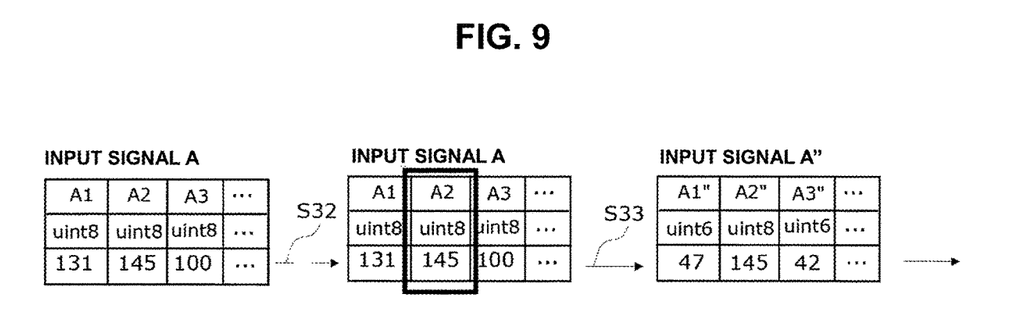
FIG. 9 is a view for explaining determination processing according to the fourth embodiment.

A conversion unit 16 converts the data type and the size of the input signal based on the determination result by the determination unit 18. For example, as shown in FIG. 9, consider a case in which an input signal A2 of input signals A1, A2, and A3 of the 8-bit unsigned integer type is a signal representing specific information (for example, a pixel value of green G). In this case, concerning the input signals A1 and A3 other than the input signal A2, the degree of importance is relatively low, or the information amount is small. For this reason, the conversion unit 16 converts the data type and size (unit8) of the input signals A1 and A3 into the 6-bit unsigned integer type (unit 6).

A table selection unit 17 selects, from the plurality of tables 120C, a table matching the data type and the size of the input signal concerted by the conversion unit 16.

[CNN Processing Method]

Figure 10:
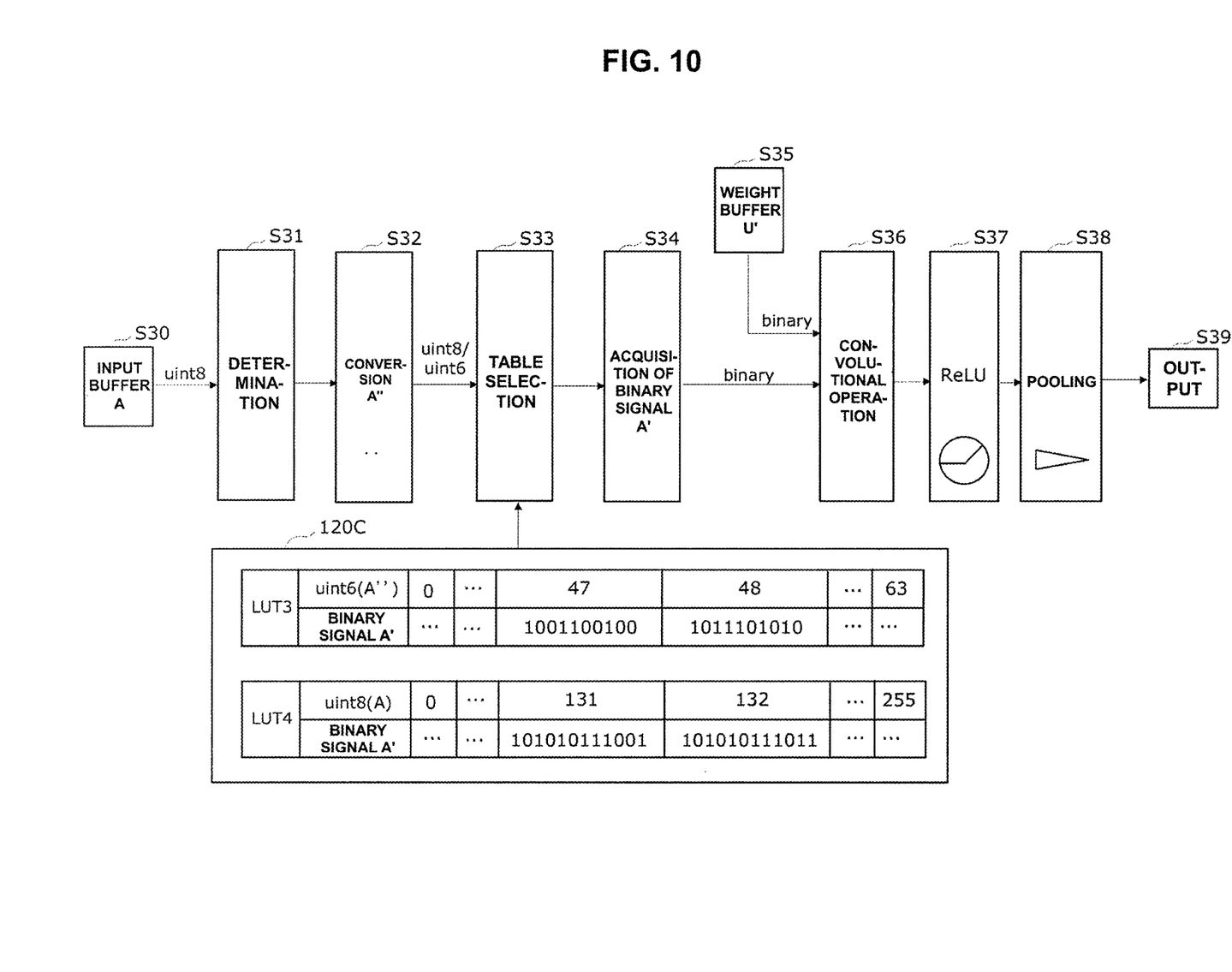
FIG. 10 is a view for explaining the procedure of a CNN processing method according to the fourth embodiment.

The operation of the CNN processing apparatus 1C having the above-described arrangement will be described next with reference to FIGS. 9 and 10. As a presumption, the plurality of tables 120C are stored in the storage unit 12 in advance. Also, in the following description, as for a weight, a corresponding binary signal is assumed to be stored in the storage unit 12 in advance.

First, the input buffer 10 temporarily stores an input signal A given from a server or the like installed outside the CNN processing apparatus 1C (step S30). The input signal A includes, for example, the signals A1, A2, and A3 expressed by the 8-bit unsigned integer type (unit 8), as shown in FIG. 9.

Next, the determination unit 18 reads out the input signal A from the input buffer 10, and determines whether the input signal A is a signal representing specific information (step S31). For example, in the example shown in FIG. 9, the determination unit 18 determines that, of the input signals A1, A2, and A2, the input signal A2 is a signal representing specific information. Here, the specific information is information representing that the input signal is more important information or has a larger information amount, as described above. More specifically, if green G has a large information amount or is to be emphasized in an input signal formed by R, G, and B components, it is specified by the determination of the determination unit 18 that the input signal A2 is information representing green G.

After that, the conversion unit 16 converts the data type and the size of the input signal A based on the determination result by the determination unit 18 (step S32). More specifically, as shown in FIG. 9, for the input signals A1 and A3 other than the input signal A2 representing the specific information, since the information amount is small, or the degree of importance is relatively low, the conversion unit 16 converts the data type and the size from the 8-bit unsigned integer type (unit8) to the 6-bit unsigned integer type (unit6). Note that in this example, for the input signal A2 representing the specific information, the 8-bit unsigned integer type is maintained.

After that, the table selection unit 17 selects, from the plurality of tables 120C stored in the storage unit 12, a table that matches the data type and the size of an input signal A" converted by the conversion unit 16 (step S33). More specifically, the table selection unit 17 selects LUT3 for the input signals A1" and A3" converted into the 6-bit unsigned integer type (unit6), and selects LUT4 for the signal A2 whose data type remains the 8-bit unsigned integer type (unit8).

Next, a binary signal acquisition unit 13 acquires a binary signal A' corresponding to the input signals A1", A2, and A3" by referring to the LUT3 and the LUT4 selected by the table selection unit 17 (step S34). As shown in FIG. 10, the binary signal A' stored in the LUT3 and corresponding to the input signal of the 6-bit unsigned integer type (unit6) has 10 bits. On the other hand, the binary signal A' stored in the LUT4 and corresponding to the input signal of the 8-bit unsigned integer type (unit8) has 12 bits, and a larger amount of information is included.

After that, a binary signal U' of a weight stored in the storage unit 12 is transferred to a weight buffer 11 (step S35).

Next, the binary signal A' of the input signal A and the binary signal U' of the weight are input to a convolutional operation unit 14, and a convolutional operation is performed (step S36). The convolutional operation unit 14, for example, calculates the exclusive NOR (XNOR) of the binary signals A' and U' of the input signal and the weight and performs bit count (popcnt), thereby obtaining the operation result of the convolutional operation.

Next, an activation function such as ReLU is applied to the result of the convolutional operation, thereby deciding the output of the convolution layer (step S37). After that, well-known pooling processing is performed as needed (see non-patent literature 1) (step S38), and the obtained output signal is stored in an output buffer 15 as the operation result of the convolution layer corresponding to one layer (step S39). Note that the output signal stored in the output buffer 15 is used as an input signal to a subsequent convolution layer.

The output obtained by repetitively performing the convolutional operation in the convolution layer of the CNN is input to a fully connected layer that constitutes a subsequent classifier (not shown) as the output of the feature extraction unit of the CNN, thereby discriminating the image data of the input signal A or the like.

As described above, according to the CNN processing apparatus 1C of the fourth embodiment, it is determined whether the input signal given to the CNN represents specific information. That is, it is determined whether the input signal includes a larger information amount, or the degree of importance of the included information is relatively high. If the input signal represents specific information, for such an input signal, a binary signal with an information amount larger than other input signals is acquired. It is therefore possible to reduce the data amount to be processed while improving the accuracy of the CNN even if a binary signal is used.

The embodiments of the neural network processing apparatus, the neural network processing method, and the neural network processing program according to the present invention have been described above. However, the present invention is not limited to the above-described embodiments and various changes and modifications assumed by those skilled in the art can be made without departing from the scope of the appended claims of the present invention.

For example, in the above-described embodiments, a CNN has been described as an example of a neural network. However, the neural network employed by the neural network processing apparatus is not limited to the CNN.

Also, in the above-described embodiments, a case in which a binary signal corresponding to an input signal is acquired has been described. The CNN processing apparatus may acquire not only the binary signal of the input signal but also a binary signal similarly for, for example, a weight or the like.

Additionally, in the above-described embodiments, a case in which the binary signal of an input signal or the like is acquired in the first layer of the CNN has been described. The binary signal acquisition processing according to the embodiments may be applied to, for example, a layer other than the first layer in the intermediate layer of the CNN.

Also, when the binary signal acquisition processing according to the above-described embodiments is applied to at least one layer of a multilayer CNN, it is possible to suppress lowering of the accuracy of the CNN, and it is also possible to reduce the calculation load and speed up processing in the CNN. Hence, the effect of the present invention can be obtained by a simpler arrangement.

Note that various functional blocks, modules, and circuits described in association with the embodiments disclosed here can be executed using a general-purpose processor, a GPU, a digital signal processor (DSP), an application specific integrated circuit (ASIC), an FPGA or another programmable logic device, a discrete gate or a transistor logic, a discrete hardware component, or a combination of some of the above-described devices designed to implement the above-described functions.

A microprocessor can be used as a general-purpose processor. Instead, a processor, a controller, a microcontroller, or a status device according to a conventional technique can also be used. The processor can also be implemented as, for example, a combination of a DSP and a microprocessor, a plurality of microprocessors, one or more microprocessors connected to a DSP core, or a combination of calculation devices that are arbitrary configurations.

EXPLANATION OF THE REFERENCE NUMERALS AND SIGNS

1 . . . CNN processing apparatus, 10 . . . input buffer, 11 . . . weight buffer, 12 . . . storage unit, 13 . . . binary signal acquisition unit, 14 . . . convolutional operation unit, 15 . . . output buffer, 101 . . . bus, 102 . . . processor, 103 . . . main storage device, 104 . . . communication interface, 105 . . . auxiliary storage device, 106 . . . input/output device, 120 . . . table, NW . . . communication network, U' . . . weight, A . . . input signal.

The invention claimed is:

1. A neural network processing apparatus comprising:
a first memory configured to store a value given to a neural network;
a second memory configured to store a table in which the value given to the neural network and a binary signal corresponding to the value are associated with each other;
a binary signal acquisition circuit configured to acquire the binary signal corresponding to the value stored in the first memory by referring to the table; and
a neural network operation circuit configured to perform an operation of the neural network based on the binary signal acquired by the binary signal acquisition circuit, wherein
the binary signal has an accuracy complying with a predetermined operation accuracy of the neural network, and the second memory stores a plurality of tables,
the binary signal acquisition circuit acquires the binary signal corresponding to the value stored in the first memory by referring to one table selected from the plurality of tables;
the neural network processing apparatus further comprising:
a table selector configured to select the one table from the plurality of tables based on a reference concerning the predetermined accuracy in accordance with the value stored in the first memory, wherein the binary signals stored in the plurality of tables have accuracies different from each other,
a determination circuit configured to determine whether the value stored in the first memory is a value representing specific information; and
a converter configured to convert, based on a determination result by the determination circuit, a data type and a size of the value stored in the first memory,
wherein the plurality of tables are provided in correspondence with at least the data types and the sizes of the value given to the neural network,
the table selector selects, from the plurality of tables, a table that matches the data type and the size of the value converted by the converter, and
the binary signal acquisition circuit acquires the binary signal corresponding to the value converted by the converter by referring to the table selected by the table selector.

2. A neural network processing apparatus comprising:
a first memory configured to store a value given to a neural network;
a second memory configured to store a table in which the value given to the neural network and a binary signal corresponding to the value are associated with each other;
a binary signal acquisition circuit configured to acquire the binary signal corresponding to the value stored in the first memory by referring to the table; and
a neural network operation circuit configured to perform an operation of the neural network based on the binary signal acquired by the binary signal acquisition circuit, wherein the binary signal has an accuracy complying with a predetermined operation accuracy of the neural network,
a converter configured to convert a data type and a size of the value stored in the first memory into a data type and a size of an address value in the table stored in the second memory and output the value,
wherein the binary signal acquisition circuit acquires the binary signal corresponding to the value output by the converter.

* * * * *